United States Patent
Spohn et al.

(10) Patent No.: US 10,924,004 B2
(45) Date of Patent: Feb. 16, 2021

(54) AC-DC CONVERTER CIRCUIT ARRANGEMENT AND METHOD FOR OPERATING A RESPECTIVE AC-DC CONVERTER CIRCUIT ARRANGEMENT

(71) Applicant: Albert-Ludwigs-Universität Freiburg, Freiburg (DE)

(72) Inventors: Lucas Spohn, Freiburg (DE); Daniel Schillinger, Bollschweil (DE); Yiannos Manoli, Freiburg (DE)

(73) Assignee: ALBERT-LUDWIGS-UNIVERSITÄT FREIBURG, Freiburg (DE)

( * ) Notice: Subject to any disclaimer, the term of this patent is extended or adjusted under 35 U.S.C. 154(b) by 0 days.

(21) Appl. No.: 16/475,055

(22) PCT Filed: Dec. 28, 2017

(86) PCT No.: PCT/EP2017/084739
§ 371 (c)(1),
(2) Date: Jun. 28, 2019

(87) PCT Pub. No.: WO2018/122329
PCT Pub. Date: Jul. 5, 2018

(65) Prior Publication Data
US 2019/0334431 A1 Oct. 31, 2019

(30) Foreign Application Priority Data
Dec. 28, 2016 (DE) .................. 10 2016 125 761.3

(51) Int. Cl.
*H02M 1/42* (2007.01)
*H02M 7/12* (2006.01)

(52) U.S. Cl.
CPC ........... *H02M 1/4225* (2013.01); *H02M 7/12* (2013.01)

(58) Field of Classification Search
CPC .............................. H02M 1/4225; H02M 7/12
See application file for complete search history.

(56) References Cited

U.S. PATENT DOCUMENTS 4,559,590 A * 12/1985 Davidson .......... H02M 3/33569
363/133
5,815,380 A * 9/1998 Cuk .................. H02M 3/33569
363/131

(Continued)

FOREIGN PATENT DOCUMENTS

DE 19515210 A1 10/1996
DE 102014218422 A1 3/2016

OTHER PUBLICATIONS

Application Note 2435: "TM sepic converter in PFC pre-regulator," STMicroelectronics 2007, downloaded on Oct. 20, 2017, www.st.com/resource/en/application_note/cd00134778.pdf, pp. 1-25.

(Continued)

*Primary Examiner* — Adolf D Berhane
*Assistant Examiner* — Kevin H Sprenger
(74) *Attorney, Agent, or Firm* — Slater Matsil, LLP (57) ABSTRACT

A converter circuit arrangement and a method for operating a converter circuit arrangement are disclosed. In an embodiment an arrangement includes a switched-mode input converter sub-stage comprising a step-up converter configured to convert a rectified input voltage on an input side into an intermediate voltage higher than the rectified input voltage, a switched-mode output converter sub-stage configured to convert the intermediate voltage into a direct output voltage at an output side, a switch configured to switch both the switched-mode input converter sub-stage and the switched-mode output converter sub-stage and a control circuit configured to control the switched-mode output converter sub-stage to a power demand at the output side independent of the switched-mode input converter sub-stage by operating (Continued)

the switch with a controlled duty cycle, wherein the control circuit is connected to the switched-mode output converter sub-stage and the output side and configured to apply a first control parameter based on a sensed output voltage and/or a sensed output current and to apply a second control parameter based on a sensed current and/or a sensed voltage of the switched-mode output converter sub-stage.

12 Claims, 3 Drawing Sheets

(56) References Cited

U.S. PATENT DOCUMENTS

| | | | | |
|---|---|---|---|---|
| 9,054,602 B2* | 6/2015 | Pollock | ............... | H02M 7/5383 |
| 2009/0262562 A1* | 10/2009 | Yang | .................. | H02M 1/4258 |
| | | | | 363/84 |
| 2013/0051090 A1* | 2/2013 | Xie | ...................... | H05B 45/382 |
| | | | | 363/21.17 |
| 2017/0025962 A1* | 1/2017 | Davidson | .......... | H02M 3/33569 |
| 2017/0098993 A1* | 4/2017 | Scherbaum | ....... | H02M 3/33546 |
| 2018/0054113 A1* | 2/2018 | Kim | ........................ | H02M 1/12 |

OTHER PUBLICATIONS

Chen, J., et al., "Analysis and Design of SEPIC Converter in Boundary Conduction Mode for Universal-line Power Factor Correction Applications," IEEE 32nd Annual Power Electronics Specialists Conference, vol. 2, Feb. 2001, pp. 742-747.

Liang, T.-J., et al., "A Novel Two-Stage Electronic Ballast for HID Lamp with SEPIC PFC," IEEE 27th Annual Applied Power Electronics Conference and Exposition (APEC), 2012, pp. 2140-2144.

Sebastian, J., et al., "Improving Power Factor Correction in Distributed Power Supply Systems Using PWM and ZCS-OR SEPIC Topologies," IEEE 22nd Annual Power Electronics Specialists Conference, Jul. 1991, pp. 780-791.

* cited by examiner

AC-DC CONVERTER CIRCUIT ARRANGEMENT AND METHOD FOR OPERATING A RESPECTIVE AC-DC CONVERTER CIRCUIT ARRANGEMENT

This patent application is a national phase filing under section 371 of PCT/EP2017/084739, filed Dec. 28, 2017, which claims the priority of German patent application 102016125761.3, filed Dec. 28, 2016, each of which is incorporated herein by reference in its entirety.

TECHNICAL FIELD

The invention pertains to a converter circuit arrangement for converting an alternating input voltage at an input side into a direct output voltage at an output side for supplying a load. The invention also pertains to a method for operating a converter circuit arrangement for converting an alternating input voltage at an input side into a direct output voltage at an output side for supplying a load.

BACKGROUND

AC-DC converters, i.e., converters for converting an alternating input voltage into a direct output voltage, usually have to fulfil a variety of regulations in order to ensure their power quality. High power quality can be achieved on the one hand by minimizing a ripple in the DC output and on the other hand by minimizing harmonics in the AC (mains) input, thus minimizing the total harmonic distortion (THD) and maximizing the power factor.

Usually, switched-mode power supplies, using switched-mode converter arrangements, are used for AC-DC conversion due to their high efficiency and small component sizes (in contrast to a capacitive or conventional transformer-based linear power supply, respectively). In terms of power quality, ideally, even a switched-mode power supply should behave like a plain resistor from the perspective of the AC input side and like an ideal DC source for the output side.

There exist various governmental regulations as well as certifications for electrical equipment defining requirements for the output of switched-mode power supplies. In order to meet such imposed regulations, at the input side of respective switched-mode power supplies, a passive (large LC low-pass filter or so called "valley-fill" circuit with capacitors and diode) or active power factor correction (PFC) circuit must be implemented. An active PFC circuit conventionally uses a boost stage that is able to convert the voltage up (boost mode) followed by a DC/DC converter. There are also active PFC circuits using some kind of buck-boost topology as single-stage design converting the voltage up (boost mode) as well as down (buck mode). The latter design should only be used if a poorly regulated high ripple output is acceptable, e.g., for lighting applications or charging. Albeit being inexpensive, this solution can only achieve a low output ripple of the line frequency if a large capacitance is placed at the output, which usually can only be realized by electrolytic capacitors. However, electrolytic capacitors may impose a serious drawback to the durability of systems. For example, thermal management of LED drivers imposes a huge design challenge, because the lifetime of an electrolytic capacitor declines dramatically with increasing temperatures (for LED drivers up to 80° C. which means 4 to 8 times less lifetime for capacitors). Furthermore, the output regulation in such topologies is very slow (usually <50 Hz).

Whenever a high power factor (=sinusoidal input power) and low output ripple (=constant output power), possibly in connection with a fast output regulation have to be obtained at the same time, the required smoothing capacitance at the output usually becomes too large to be realized and other concepts have to be used. Often, a two-stage converter design is implemented using a boost PFC converter (sinusoidal power transfer) in connection with a downstream DC/DC converter regulating the output (constant power transfer) with a high-voltage intermediate capacitor electrically connected between the two converter stages. The main drawbacks of such alternative conventional solutions lie in high costs (many components) and reduced efficiency (two stages).

SUMMARY OF THE INVENTION

Embodiments provide a converter topology enabling a high power factor in connection with a low output ripple which avoids the above drawbacks of conventional solutions.

In various embodiments, an AC-DC converter circuit arrangement is designed for converting an alternating (AC) input voltage at an input side into a direct (DC) output voltage at an output side for supplying a load. The converter circuit arrangement comprises a switched-mode input converter sub-stage and a switched-mode output converter sub-stage. The switched-mode input converter sub-stage and the switched-mode output converter sub-stage can be part of a single converter stage. This has the advantage that only one converter stage is used in contrast to conventional cascaded multi-stage (e.g., two-stage) converter designs.

The switched-mode input converter sub-stage is configured/functions as a step-up converter for converting a rectified input voltage at an input side into an intermediate voltage higher than the rectified input voltage. The switched-mode output converter sub-stage is configured/functions to convert the intermediate voltage into the direct output voltage at an output side.

The AC-DC converter circuit arrangement may comprise a rectifier for rectifying an alternating (mains) input voltage at the input side into the rectified input voltage. The rectifier can be a bridge rectifier containing several (usually four) diodes for rectifying the periodically alternating input voltage into a full-wave rectified input voltage. The bridge rectifier can also be implemented actively using switches. Alternatively, the rectifier is designed as a component separate to the herein described AC-DC converter circuit arrangement, such that the converter circuit arrangement only receives the rectified input voltage, rectified by the separate rectifier and processes further voltage conversion respectively. Preferably, the switched-mode input converter sub-stage is arranged directly electrically downstream of the rectifier. Preferably, the rectifier is designed (fast enough) to follow the input current of the switched-mode input converter sub-stage. Moreover, the rectifier preferably is designed to withstand voltage peaks created by input inductor means of the switched-mode input converter sub-stage.

Moreover, the AC-DC converter circuit arrangement comprises a switch. The switch can, for example, be designed as a metal oxide field affect transistor switch (MOSFET). The switch is configured and arranged to serve for switching both the switched-mode input converter sub-stage and the switched-mode output converter sub-stage. Hence, there is preferably only one single switch for switching both the switched-mode input converter sub-stage and the switched-mode output converter sub-stage.

The AC-DC converter circuit arrangement further comprises a control circuit configured to control the switched-mode output converter sub-stage to a power demand at the output side by operating the switch with a controlled duty cycle. In particular, the control circuit is configured to control the switched-mode output converter sub-stage independent of the switched-mode input converter sub-stage. This means that the control circuit, for example, is not connected to the input side of the converter circuit arrangement and/or does not apply any control parameter based on a sensed input voltage and/or a sensed input current or a sensed rectified input voltage and/or a sensed rectified input current. Hence, the control circuit is configured to ignore the behavior of both the input side and the switched-mode input converter sub-stage.

The control circuit is connected to the switched-mode output converter sub-stage and the output side and is configured to apply a first control parameter based on the sensed output voltage and/or a sensed output current and to apply a second control parameter based on a sensed current and/or a sensed voltage of the switched-mode output converter sub-stage.

Moreover, the converter circuit arrangement is configured and dimensioned to automatically operate the switched-mode input converter sub-stage in a discontinuous conduction mode by operating the switch during control of the switched-mode output converter sub-stage through the control circuit. In the discontinuous conduction mode (or also called "discontinuous current mode", DCM) the switched-mode input converter sub-stage is operated such that electric energy, in particular current flowing through energy storage means (e.g., one or more inductors) of the switched-mode input converter sub-stage, diminishes to zero (or diminishes to zero and remains at zero) during a part of the switching period or switching cycle. In particular, the one or more inductors of the switched-mode input converter sub-stage are completely discharged before reaching the end of the switching cycle.

The described AC-DC converter circuit arrangement bases on the principle that with the switched-mode input converter sub-stage being operated in the DCM and with the prerequisite of the intermediate voltage being higher than the rectified input voltage, the averaged current through the switched-mode input converter sub-stage is correlated to the rectified input voltage. Hence, when operated in DCM, the switched-mode input converter sub-stage works as a power factor correction (PFC) converter stage, thereby providing high power factors above 0.9 (PF>0.9).

Under these circumstances, the switched-mode output converter sub-stage can be configured to be controlled by the control circuit to operate either in the DCM (like the switched-mode input converter sub-stage), in the so-called continuous conduction mode (CCM) or in the so-called boundary conduction mode (BCM, sometimes also referred as critical conduction mode or transition mode).

In the CCM, the switched-mode output converter sub-stage is operated such that electric energy, in particular current flowing through energy storage means (e.g., one or more inductors) of the switched-mode output converter sub-stage, is continuously loaded/impressed/present during one switching cycle. This may mean that electric energy/current never falls to zero during one switching cycle, but remains at a minimum level above zero and starts rising again with the next switching cycle. This may also mean that electric energy/current crosses zero (from a positive value to a negative value or vice versa in relation to a count arrow direction) and continuously passes, but does not diminish to zero and remains at zero during a part of the switching period or switching cycle. In particular, the one or more inductors of the switched-mode output converter sub-stage are never completely discharged during one switching cycle (or are never completely discharged and remain discharged during a part of the switching period or switching cycle) in this operating state.

In the BCM, the switched-mode output converter sub-stage is operated such that electric energy, in particular current flowing through energy storage means (e.g., one or more inductors) of the switched-mode output converter sub-stage, falls (from positive value(s)) to zero exactly at the end of the switching cycle and starts rising (to positive value(s)) again exactly with the next switching cycle. In particular, the one or more inductors of the switched-mode output converter sub-stage are completely discharged exactly at the end of the switching cycle.

According to an embodiment, the switched-mode output converter sub-stage is configured to be operated in DCM. In this configuration, the DCM operation of the switched-mode input converter sub-stage is ensured as long as the intermediate voltage is higher than the rectified input voltage. This can easily be achieved by adequate sizing of the components of both the switched-mode input converter sub-stage and the switched-mode output converter sub-stage as well as one or more components for buffering electric energy generated in the switched-mode input converter sub-stage to achieve the intermediate voltage.

According to an alternative embodiment, the switched-mode output converter sub-stage is configured to be operated in BCM. The BCM is a special case of the DCM and in so far represents a transition mode between the DCM and the CCM. In terms of optimized efficiency, the BCM is preferable over the DCM.

According to an alternative embodiment, the switched-mode output converter sub-stage is configured to be operated in CCM. The CCM has the advantage of low current peaks and thus RMS average currents through the components of the switched-mode output converter sub-stage and the switch as well as reduced conduction losses compared to the DCM or BCM. Therefore, the CCM can preferably be used for high power applications. However, in this configuration, additionally to the prerequisite of the intermediate voltage being higher than the rectified input voltage, special attention must be focused on the sizing of the components of the AC-DC converter circuit arrangement in order to further ensure a stable DCM operation of the switched-mode input converter sub-stage, as explained above. In particular, the ratio of inductors of the switched-mode input converter sub-stage and inductors of the switched-mode output converter sub-stage must be reduced in CCM compared to a configuration in DCM or BCM regarding the switched-mode output converter sub-stage in order to obtain the same power factor.

The explained AC-DC converter circuit arrangement is configured to be operated as if only consisting of the switched-mode output converter sub-stage. The switched-mode input converter sub-stage, while sharing the switch and thus being controlled by the same signal as the switched-mode output converter sub-stage, automatically provides an active power factor correction without the need for an active input current shaping (for example, by the control circuit/controller). Hence, the explained AC-DC converter circuit arrangement provides a kind of add-on PFC functionality which enables AC-DC converters to achieve a very high power factor (PF>0.9), while still being able to perform a tight (and fast) output regulation for a low output ripple. As an essential feature, this concept does not rely on large (e.g., electrolytic) smoothing capacitors and thus can be used for the realization of AC-DC converters with very long lifetimes even under rough environments, like, e.g., under high temperatures. Hence, a converter topology is realized enabling a high power factor in connection with a low output ripple which is easy to implement, reliable, and very cost-efficient.

The concept of the explained AC-DC converter circuit arrangement can be adapted to any conventional converters (typically of higher order), with the above-explained prerequisites being fulfilled. For example, the concept can be realized with so-called "Single ended primary inductance converters" (SEPIC) or with the known Cuk-Converter topology.

In various embodiments of the above-explained AC-DC converter circuit arrangement, the switched-mode output converter sub-stage can be configured as a step-down converter stage for converting the intermediate voltage into the direct output voltage lower than the intermediate voltage. Hence, an alternating input voltage can be converted into a lower direct output voltage for supplying a load with low effort. In this configuration, with the switched-mode input converter sub-stage being configured as a step-up converter (boost converter), the switched-mode output converter sub-stage works as buck converter. Hence, the AC-DC converter circuit arrangement can be preferably realized with converter topologies combining an input boost stage with an output buck stage. For example, a SEPIC converter can be used which provides a boost stage as input converter sub-stage that transfers the charge flowing through an input inductor onto an intermediate capacitor. If the intermediate capacitor is regarded as a voltage source for the second output sub-stage, an inverting buck-boost circuit or flyback topology (if output is isolated) can be recognized in the SEPIC converter as output converter sub-stage. Alternatively, a Cuk converter can be used which also provides a boost stage as input converter sub-stage. Contrary to the SEPIC topology, the Cuk converter provides a pure buck stage as output converter sub-stage.

In various embodiments the AC-DC converter circuit arrangement may comprise an electric energy buffer configured and arranged to buffer electric energy generated in the switched-mode input converter sub-stage and dimensioned to achieve the intermediate voltage higher than the rectified input voltage and to provide the intermediate voltage as a supply voltage to the switched-mode output converter sub-stage. The electric energy buffer can be an intermediate capacitor electrically connected between the switched-mode input converter sub-stage and the switched-mode output converter sub-stage. The electric energy buffer stores charge flowing through the switched-mode input converter sub-stage in order to establish the intermediate voltage as a supply voltage for the switched-mode output converter sub-stage. Preferably, the electric energy buffer is dimensioned such that the above-explained prerequisite of the intermediate voltage being higher than the rectified input voltage can be guaranteed. This contributes to ensure that the switched-mode input converter sub-stage reliably operates in the DCM. With the electric energy buffer providing the intermediate voltage as a supply voltage to the switched-mode output converter sub-stage, the control circuit can control the switched-mode output converter sub-stage to a power demand at the output side for supplying a load, thereby completely ignoring the electric behavior of the switched-mode input converter sub-stage. Under the explained prerequisites the latter provides a reliable and efficient PFC functionality.

In various embodiments of the above-explained AC-DC converter circuit arrangement, the control circuit may be configured to control the switched-mode output converter sub-stage to operate in the BCM. As explained above, the BCM operation mode provides for an optimized efficiency. BCM is very suited for the special operation of the AC-DC converter with automatic PFC as explained. In contrast to other regulation schemes, it is very flexible and offers several other advantages. The control circuit may comprise the following components and functionality:—a first comparator configured for comparing a value of the first control parameter based on a difference between the output voltage or the output current and a respective reference value with a value of an inductor current of the switched-mode output converter sub-stage as the second control parameter, and—a second comparator configured for comparing the value of the inductor current of the switched-mode output converter sub-stage as the second control parameter with a Zero-Reference-Value.

In this way, a BCM control can easily be achieved by the control circuit. In particular, the control circuit may be configured to enable the switch as soon as the value of the inductor current of the switched-mode output converter sub-stage reaches the Zero-Reference-Value and to disable the switch as soon as the value of the inductor current of the switched-mode output converter sub-stage reaches the value of the first control parameter. In this way, the duty cycle of the switch can be controlled. Such a control scheme is easy to implement in hard-/software for low development costs.

As explained, the first control parameter bases on a difference between the output voltage or the output current and a respective reference value. The reference value represents a target value or nominal value of a power demand of an electric load to be supplied by the output direct voltage. In contrast, the output voltage or the output current represent the actual or real power values at the output side. By calculating the difference between the output voltage or the output current and the respective reference value, an error value between the actual power situation and the target power demand is determined. The control circuit may comprise a specially designed controller. The error value can be fed into this controller which itself provides the first control parameter for comparison with the value of the inductor current of the switched-mode output converter sub-stage as the second control parameter in order to control of the duty cycle of the switch. Depending on the application scenario, the controller can, for example, be a PI- or PID-controller. Other or additional controller topologies can also be suitable.

Alternatively to a control of the switched-mode output converter sub-stage to operate in the BCM, the control circuit may be configured to control the switched-mode output converter sub-stage to operate in the CCM. For this purpose, the above-explained control scheme can easily be adapted in such a way that the Zero-Reference-Value for comparing the value of the inductor current of the switched-mode output converter sub-stage by the second comparator is changed to a value larger than zero. With such a configuration, the control circuit is configured to enable the switch as soon as the value of the inductor current of the switched-mode output converter sub-stage reaches the respective value larger than zero.

In various embodiments of the above-explained AC-DC converter circuit arrangement, the switched-mode input converter sub-stage may comprise at least one first inductor and the switched-mode output converter sub-stage may comprise at least one second inductor. Preferably, the first and second inductors are isolated from each other, i.e., non-coupled inductors. In this way, it can be achieved that currents through first and second inductors are not proportional to each other. This is or can be necessary for the control of the switched-mode output converter sub-stage independent of the switched-mode input converter sub-stage, thereby achieving a PFC functionality with high efficiency at the switched-mode input converter sub-stage as explained above, and, nevertheless, providing a tight (and fast) output regulation of the switched-mode output converter sub-stage to a desired power level. In particular when using a SEPIC design as converter topology in the herewith described concept, an asynchronous current flow is required for a proper PFC operation of the converter topology. This is further explained below.

In various embodiments of the above-explained AC-DC converter circuit arrangement, the control circuit can be designed to control the switch with a duty cycle which is constant or nearly constant at least over a period of the alternating input voltage. Variations of the duty cycle may lead to a distortion of the input current and can worsen the PFC functionality below acceptable levels. With a duty cycle being as constant as possible (by using an adequately large electric energy buffer between the switched-mode input converter sub-stage and the switched-mode output converter sub-stage), a reliable PFC functionality of the switched-mode input converter sub-stage within acceptable constraints can be realized. "Nearly constant" or "as constant as possible" should be read in the context that the control circuit (or a controller within the control circuit) has to compensate a (slight) decrease of the intermediate voltage during a zero crossing of the alternating input voltage, such that a slight variation of the duty cycle can be necessary. With the converter circuit arrangement properly designed and dimensioned, such a slight variation of the duty cycle, nevertheless, should be tolerable and be understood as a variation falling under the term "nearly constant" or "as constant as possible".

In various embodiments of the above-explained AC-DC converter circuit arrangement, the control circuit can be designed to control the switch with a varying switching frequency during a period of the alternating input voltage. Also in this embodiment, the control circuit can be designed to provide a constant or nearly constant duty cycle, with the advantages as explained above. A varying switching frequency has the advantage that an automatic spread spectrum modulation of the input current can be realized. This enables a reduction of an input filter for cost and size optimization. An input filter can be advantageously provided as an electromagnetic interference (EMI) filter. The input filter can be integrated in the converter circuit arrangement or can be configured as a component separate from the converter circuit arrangement.

In various embodiments the method serves the purpose of operating an AC-DC converter circuit arrangement for supplying a load and comprises the following steps:

converting a rectified input voltage on an input side into an intermediate voltage higher than the rectified input voltage by a switched-mode input converter sub-stage, and converting the intermediate voltage into a direct output voltage at an output side by a switched-mode output converter sub-stage.

In order to achieve the rectified input voltage, an alternating (mains) input voltage at an input side may be rectified into the rectified input voltage by means of a rectifier. The rectifier can be of the kind as explained in the context of an AC-DC converter circuit arrangement of the kind above.

Moreover, according to the method, a switch is operated by a control circuit with a controlled duty cycle, the switch serving for switching both the switched-mode input converter sub-stage and the switched-mode output converter sub-stage. Hence, both the switched-mode input converter sub-stage and the switched-mode output converter sub-stage are switched by one common switch.

Further, the control circuit applies a first control parameter based on the sensed output voltage and/or a sensed output current and a second control parameter based on a sensed current and/or a sensed voltage of the switched-mode output converter sub-stage for controlling the switched-mode output converter sub-stage to a power demand at the output side. In particular, the control circuit controls the switched-mode output converter sub-stage independent of the switched-mode input converter sub-stage. This means that the control circuit, for example, is not connected to the input side of the converter circuit arrangement and/or does not apply any control parameter based on a sensed input voltage and/or a sensed input current or a sensed rectified input voltage and/or a sensed rectified input current. Hence, the control circuit ignores the behavior of both the input side and the switched-mode input converter sub-stage during control of the switched-mode output converter sub-stage.

The switched-mode input converter sub-stage is automatically operated in a discontinuous conduction mode (DCM) by operating the switch during control of the switched-mode output converter sub-stage through the control circuit. The described method bases on the principle that with the switched-mode input converter sub-stage being operated in the DCM and with the prerequisite of the intermediate voltage being higher than the rectified input voltage, the averaged current through the switched-mode input converter sub-stage is correlated to the rectified input voltage. Hence, when operated in DCM, the switched-mode input converter sub-stage works as a power factor correction (PFC) converter stage, thereby providing high power factors above 0.9 (PF>0.9).

Under these circumstances, in alternative implementations of the above-explained method, the switched-mode output converter sub-stage can be controlled by the control circuit to operate either in the DCM (like the switched-mode input converter sub-stage), in the CCM or in the BCM. For differences and advantages of DCM, BCM or CCM with respect to each other, reference is made to the explanations in the context of an AC-DC converter circuit arrangement of the kind above.

The explained method provides for an operation of an AC-DC converter circuit arrangement as if only consisting of a switched-mode output converter sub-stage. The switched-mode input converter sub-stage, while sharing the switch and thus being controlled by the same signal as the switched-mode output converter sub-stage, automatically provides an active power factor correction without the need for an active input current shaping (for example, by the control circuit/controller). Hence, the explained method provides a specific operation of conventional converter topologies which enables AC-DC converters to achieve a very high power factor (PF>0.9), while still being able to perform a tight (and fast) output regulation for a low output ripple. As an essential feature, while implementing this method, large (e.g., electrolytic) smoothing capacitors can be dispensed with. Hence, AC-DC converters can be operated with very long lifetimes even under rough environments, like, e.g., under high temperatures. Hence, a method for operating a converter topology is realized enabling a high power factor in connection with a low output ripple which is easy to implement, reliable, and can be implanted in hard- and/or software with very low costs.

The concept of the explained method can be applied to any conventional converters (typically of higher order), with the above-explained prerequisites being fulfilled. For example, the concept can be realized by operating so-called "Single ended primary inductance converters" (SEPIC) or by operating the known Cuk-Converter topology.

In various implementations of the above-explained method, the intermediate voltage is converted into the direct output voltage lower than the intermediate voltage. Hence, an alternating input voltage can be converted into a lower direct output voltage for supplying a load with low effort and an easy implementation.

In various implementations of the above-explained method, electric energy generated in the switched-mode input converter sub-stage is buffered in an electric energy buffer such that the intermediate voltage higher than the rectified input voltage is achieved and provided as a supply voltage to the switched-mode output converter sub-stage. For a suitable dimension of such an electric energy buffer and for additional advantageous aspects in this regard, reference is made to the explanations in the context of an AC-DC converter circuit arrangement of the kind above.

In various implementations of the above-explained method, the switched-mode output converter sub-stage is controlled by the control circuit such that the switched-mode output converter sub-stage operates in BCM. The control circuit may compare a value of the first control parameter based on a difference between the output voltage or the output current and a respective reference value with a value of an inductor current of the switched-mode output converter sub-stage as the second control parameter. Moreover, the control circuit may compare the value of the inductor current of the switched-mode output converter sub-stage as the second control parameter with a Zero-Reference-Value.

In this way, a BCM control by means of the control circuit can easily be implemented. In particular, the control circuit may enable the switch as soon as the value of the inductor current of the switched-mode output converter sub-stage reaches the Zero-Reference-Value and may disable the switch as soon as the value of the inductor current of the switched-mode output converter sub-stage reaches the value of the first control parameter. In this way, the duty cycle of the switch can be controlled. Such a control scheme is easy to implement in hard-/software for low development costs. Alternatively to a control of the switched-mode output converter sub-stage to operate in the BCM, the control circuit may control the switched-mode output converter sub-stage such that the switched-mode output converter sub-stage operates in the CCM. For this purpose, the above-explained control scheme can easily be adapted in such a way that the Zero-Reference-Value for comparing the value of the inductor current of the switched-mode output converter sub-stage by the second comparator is changed to a value larger than zero. For additional advantageous aspects in this regard, reference is made to the explanations in the context of an AC-DC converter circuit arrangement of the kind above.

In various implementations of the above-explained method, the control circuit can control the switch with a duty cycle which is constant or nearly constant at least over a period of the alternating input voltage. In further various implementations of the above-explained method, the control circuit can control the switch with a varying switching frequency during a period of the alternating input voltage. For additional advantageous aspects in this regard, reference is made to the explanations in the context of an AC-DC converter circuit arrangement of the kind above.

The AC-DC converter circuit arrangement of the kind explained above or the method of the kind explained above can advantageously be used in a power supply unit, in particular for driving a light emitting device arrangement.

All advantageous aspects, features and measures of an AC-DC converter circuit arrangement of the kind explained above can analogous be applied to a method of the kind explained above. Vice versa, all advantageous aspects, features and measures of a method of the kind explained above may find application in respective structural aspects, features, and embodiments of an AC-DC converter circuit arrangement of the kind explained above.

BRIEF DESCRIPTION OF THE DRAWINGS

The invention is further described in the following under consideration of different embodiments with the aid of several figures.

The figures show in.

DETAILED DESCRIPTION OF ILLUSTRATIVE EMBODIMENTS

Figure 1:
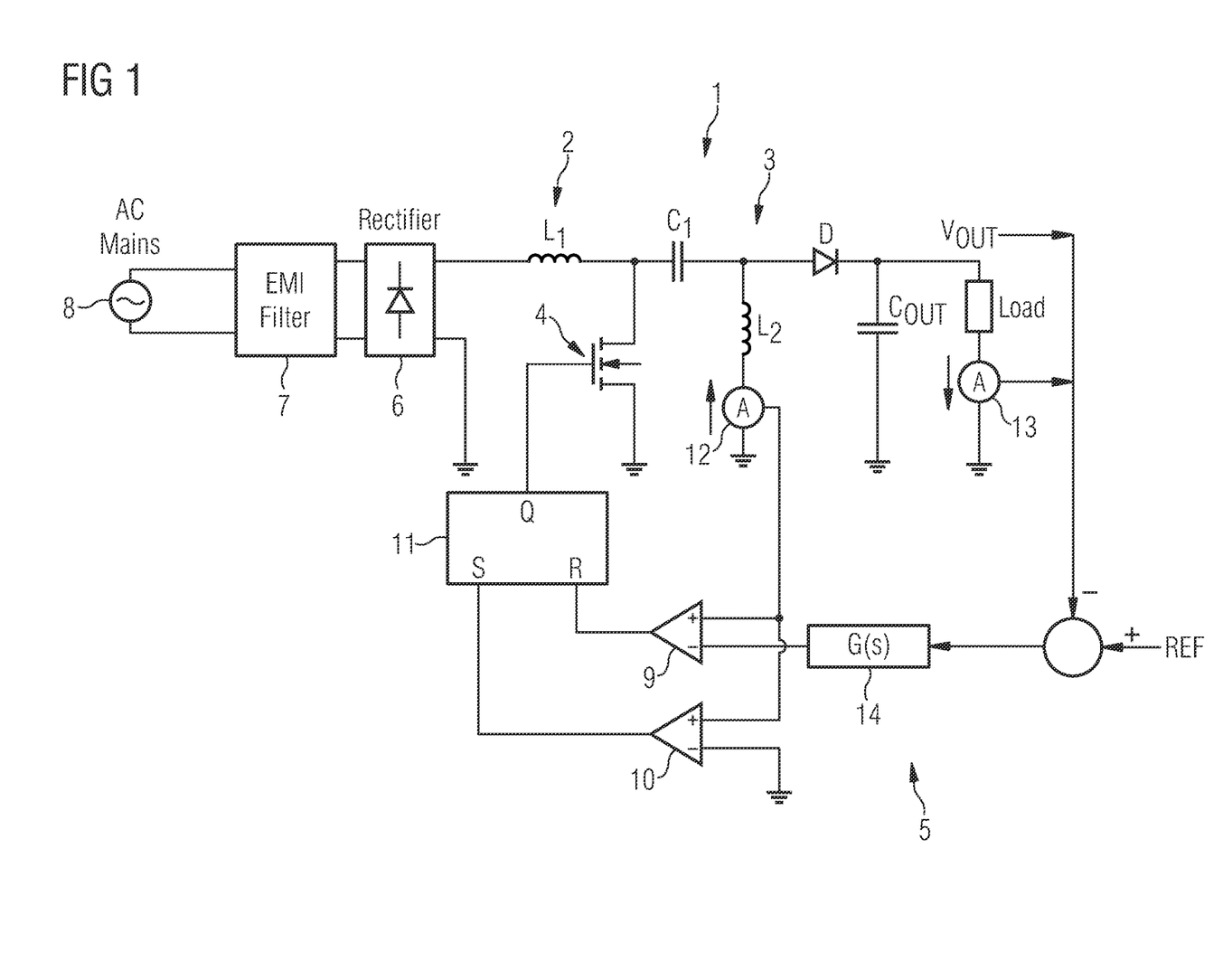
FIG. 1 shows an embodiment of an AC-DC converter circuit arrangement.

FIG. 1 shows an embodiment of AC-DC converter circuit arrangement 1. One possible field of application, amongst others, for such an AC-DC converter circuit arrangement is LED lighting. An LED is ideally operated by a constant DC current source, but LED luminaires are usually installed at positions where only mains AC voltage is provided. Thus, most LED luminaires require their own power supply which has to fulfil inter alia the above mentioned regulations and should be of high efficiency. For example, tough power factor limits (>0.9) exist for high power luminaires (>25 W) and/or commercial/industrial use.

Still, there is a huge span for improvement in LED driving technology. First of all, flicker of LED lighting caused by line frequency output ripple has been identified as a health risk to viewers as it can induce eye strain, headache or even more serious adverse effects like photosensitive seizures. The IEEE suggests an output current peak-to-peak ripple limit of 16% of the average current at 100 Hz (which equals a rectified 50 Hz line frequency). For most of the currently used low-budget LED driver circuits, this is hard to achieve without having large electrolytic output-smoothing capacitors.

Another LED driver design challenge is lifetime, which affects total system and installation costs as well as sustainability. LED devices, like most of the other electrical components, nowadays are able to reach a lifetime over 100,000 hours. However, electrolytic capacitors impose a serious drawback to the durability of systems. In particular, thermal management imposes a huge design challenge. For example, if the driver electronics is placed next to the LED, as, e.g., within retrofit luminaires, it must withstand high temperatures up to 80-100° C. While being no concern for most semiconductor and passive electronics, only premium electrolytic capacitors are rated for 10,000 h at 105° C. Consequently, AC-DC-converter designs without electrolytic capacitors offer high benefits considering lifetime in high-temperature environments, like within a luminaire.

The AC-DC converter circuit arrangement according to the present disclosure traverses the drawbacks of conventional designs and provides a reliable, easy-to-implement and cost-efficient solution for diverse applications.

Returning to FIG. 1, the AC-DC converter circuit arrangement 1 comprises a converter for converting an alternating input voltage 8 (AC mains) into a direct output voltage Vout. According to the embodiment of FIG. 1 the converter has a SEPIC topology comprising a switched-mode input converter sub-stage 2 and a switched-mode output converter sub-stage 3.

The switched-mode input converter sub-stage 2 comprises an inductor L1 configured as series inductor and is operated by a switch 4. In the embodiment according to FIG. 1, the switch 4 is configured as MOSFET switch. The switched-mode input converter sub-stage 2 is configured as a step-up converter sub-stage (boost converter sub-stage). The switched-mode output converter sub-stage 3 comprises an inductor L2 configured as parallel inductor as well as a diode D. Also the switched-mode output converter sub-stage 3 is operated by the switch 4. The switched-mode output converter sub-stage 3 is configured as an inverting buck-boost converter sub-stage. The first and second inductors L1 and L2 are isolated from each other, i.e., non-coupled inductors. This effect is explained below.

Furthermore, the AC-DC converter circuit arrangement 1 comprises an intermediate capacitance C1 electrically connected between the input inductor L1 of the switched-mode input converter sub-stage 2 and the further components (output inductor L2 and diode D) of the switched-mode output converter sub-stage 3. The intermediate capacitance C1 works as electric energy buffer for storing charge of the input inductor L1 in order to achieve an intermediate voltage which is provided as a supply voltage for the switched-mode output converter sub-stage 3. A parallel output capacitance Cout is arranged for filtering a high-frequency ripple caused by the switching of the converter circuit arrangement through switch 4. Since the intermediate capacitance C1 filters the input (line) frequency, Cout can be very small and implemented, e.g., as durable and compact ceramic capacitor.

Hence, with the aid of the SEPIC topology of the AC-DC converter circuit arrangement 1 according to FIG. 1 an alternating input voltage 8 can be converted into a lower direct output voltage Vout for supplying a load connected to the output side. The switched-mode input converter sub-stage 2 and the switched-mode output converter sub-stage 3 are operated by the switch 4 with a controlled duty cycle, which means that the switch 4 is enabled (switched on) and disabled (switched off) with a controlled ratio between the on time and off time during a switching cycle or switching period.

The AC-DC converter circuit arrangement 1 according to FIG. 1 further comprises an electromagnetic interference filter (EMI Filter) 7 for filtering the electric input signals from the alternating input voltage 8 in order to attenuate a conducted electromagnetic interference between the AC Mains line and the downstream components. Moreover, a rectifier 6 is electrically connected between the EMI filter 7 and the switched-modes input converter sub-stage 2 (in detail the input inductor L1 and ground). The rectifier 6 serves the purpose of rectifying the alternating input voltage 8 into a rectified input voltage. For example, the rectifier 6 is designed as bridge rectifier with four diodes (not explicitly illustrated) for converting the periodically oscillating input voltage 8 (with positive and negative half waves) into a rectified signal only consisting of positive half waves. Alternatively, the rectifier 6 can also be designed as active rectifier with actively controlled switches. Preferably, the rectifier 6 is designed as a fast rectifier in order to follow an input inductor current in the inductor L1 of the switched-mode input converter sub-stage 2. Moreover, the rectifier, preferably, is configured to withstand voltage peaks created in the input inductor L1.

Additionally, the AC-DC converter circuit arrangement 1 comprises a control circuit 5. The control circuit 5 serves the purpose of controlling the switched-mode output converter sub-stage 3 by operating the switch 4 to a power demand at an output side. In detail, the control circuit 5 is electrically connected to the output side, the inductor L2 of the switched-mode output converter sub-stage 3 and the switch 4. The control circuit 5 is configured as a BCM control loop for controlling the switched-mode output converter sub-stage 3 in a BCM mode. This functionality is further explained below. For this purpose, a difference between the output voltage Vout or an output current (measured by an ammeter 13) through a load, connected to the output side, and a reference value REF is calculated. This difference represents an error value between the actual value of the output voltage Vout or the output current respectively and a target value of a desired output voltage or a desired output current according to a power demand of the load.

The error value is fed into a controller 14 (illustrated by the transition function G(s)). The controller 14 can, for example, be a PI or PID controller. The controller 14 converts the error value into a value of a control parameter which represents a maximum target value of the inductor current through the inductor L2 of the switched-mode output converter sub-stage 3. The value of the control parameter is compared with the actual inductor current through the inductor L2 (measured by an ammeter 12 with, e.g., a shunt resistor) by a first comparator 9. A second comparator 10 compares the actual inductor current through the inductor L2 against a Zero-Reference-Value at ground potential.

Further regarding the control scheme of FIG. 1, depending on the results of the two comparators 9 and 10, a flip-flop 11 can be triggered. The output of the first comparator 9 is connected to the R-input of the flip-flop 11 and the output of the second comparator 10 is connected to the S-input of the flip-flop 11. The output Q of the flip-flop 11 provides a control signal for switching the switch 4.

With such a control loop, the control circuit 5 enables the switch 4 as soon as the value of the inductor current through the inductor L2 of the switched-mode output converter sub-stage 3 reaches the Zero-Reference-Value and disables the switch 4 as soon as the value of the inductor current through the inductor L2 of the switched-mode output converter sub-stage 3 reaches the value of the control parameter (output by the controller 14 as explained above). Hence, the switched-mode output converter sub-stage 3 is controlled to operate in BCM mode.

As can be seen in FIG. 1, the control circuit 5 exclusively controls the switch-mode output converter sub-stage 3 basing on control parameters of the output side and the inductor current through the inductor L2, but without applying any control parameter based on the input side, namely based on the alternating input voltage 8 or an input current, not to mention a rectified input voltage or a rectified input current. Hence, the control circuit 5 controls the AC-DC converter circuit arrangement 1 as if only consisting of the switched-mode output converter sub-stage 3. This means that the control circuit 5 completely ignores the behavior of the switched-mode input converter sub-stage 2. The switched-mode input converter sub-stage 2, thereby, is dimensioned and configured to operate in DCM mode.

Only few conventional topologies offer the possibility to sense an inductor current using a simple shunt resistor connected between inductor and ground (see ammeter 12). If the inductor is not connected to ground, high-side current sensing techniques must be used that present several obstacles. Commercial PFC controllers therefore often use a shunt resistor in series to the MOSFET source for peak-current detection and an auxiliary winding of the inductor for zero-current detection. In addition, PFC controllers usually rely on the sensing of the alternating input voltage 8 in order to multiply the sensed input voltage and an error signal for generating a current limit value, ensuring a sinusoidal average input current proportional to the input voltage as demanded for PFC.

In contrast, the present disclosure offers the advantage of requiring only one current sensor for proper PFC operation (e.g., via a shunt resistor in ammeter 12, excluding output current/voltage sensors at an output side). Only the output inductor current IL2 must be monitored as the waveform of input inductor L1 is automatically shaped by design for proper PFC operation when specific design aspects are satisfied. Hence, the present disclosure does not need any input voltage sensing for the PFC because the latter is automatically provided by the design under the given aspects which are explained in detail below. Therefore, and in contrast to usual PFC converters, a fast output regulation can be achieved. The whole circuit arrangement is controlled as if it would consist only of the switched-mode output converter sub-stage 3. The switched-mode input converter sub-stage 2 sharing the switch 4 automatically follows in PFC mode.

With such an AC-DC converter circuit arrangement 1 applying a control scheme as explained above, a very high power factor above 0.9 in combination with a very low output ripple at the output capacitance Cout can be easily achieved with low implementation costs. Only one single converter topology with a boosting input converter, here exemplarily a SEPIC topology, is used, without the need of a cascaded multi-stage converter topology. The circumstances leading to these advantageous effects are explained in the following.

Within the switched-mode input converter sub-stage 2, the input current equals the input inductor current through inductor L1. As long as the voltage over the capacitor C1 is held fairly constant and as long as the inductors L1 and L2 are being operated in DCM or BCM respectively (with regard to the inductor L2 of switched-mode output converter sub-stage 3) with a constant or nearly constant duty cycle over the line cycle, the input current, low-pass-filtered by the EMI filter 7, is approximately proportional to the alternating input voltage 8, giving automatically a very high power factor.

One essential aspect is that under certain prerequisites, the AC-DC converter circuit arrangement can be operated as if only consisting of the second, output sub-stage, see explanations above. The switched-mode input converter sub-stage 2, while sharing the switch 4 and thus controlled by the same signal as the switched-mode output converter sub-stage 3, automatically provides an active power factor correction (PFC) without the need for an active input current shaping. Here, the concept is explained in detail for the SEPIC topology, but the specified operation mode was also verified for the Cuk converter in simulation and can also be adapted to any converters of higher order, when certain prerequisites are fulfilled, as explained later.

The rise of the currents iL1 and iL2 through the inductors L1 and L2 during turn-on of the switch 4 can be approximated by the following equations, where Vrect equals the rectified input voltage and VC1 the voltage over the intermediate capacitor C1:

$$\frac{di_{L1}(t)}{dt} = \frac{V_{rect}}{L_1} \quad (1)$$

$$\frac{di_{L2}(t)}{dt} = \frac{V_{C1}}{L_2} \quad (2)$$

When the switch 4 is turned off, the decline of the currents iL1 and iL2 can be approximated by the following equations, where Vout denotes the output voltage:

$$\frac{di_{L1}(t)}{dt} = \frac{-(V_{C1}+V_{out})+V_{rect}}{L_1} \quad (3)$$

$$\frac{di_{L2}(t)}{dt} = \frac{-V_{out}}{L_2} \quad (4)$$

Figure 2:
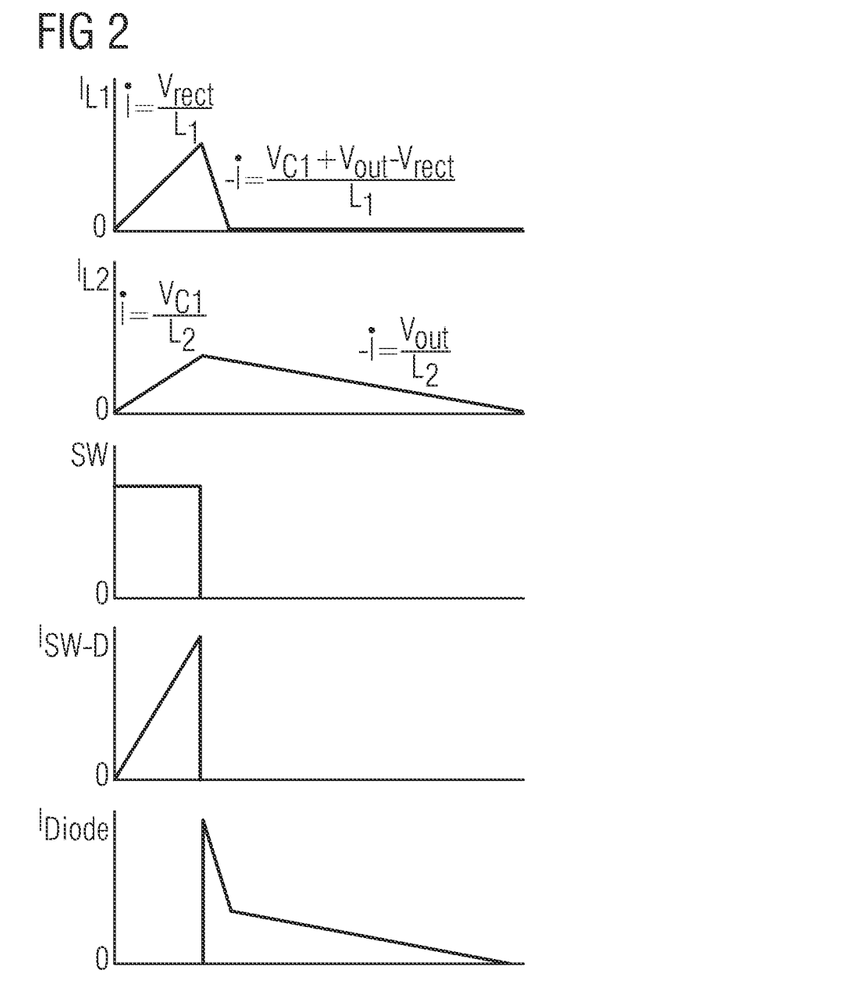
FIG. 2 shows characteristic curves of several electric parameters in the AC-DC converter circuit arrangement of FIG. 1.

FIG. 2 illustrates the current waveforms of the inductors ($I_{L1}$, $I_{L2}$), the control signal of the switch 4 (SW), i.e., the gate voltage of MOSFET switch 4, the current through the switch 4 ($I_{SW\text{-}D}$) as well as the current through the diode D ($I_{Diode}$). In contrast to the typical operation of a SEPIC (e.g., with coupled inductors for L1 and L2), the currents through the inductors L1 and L2 are not proportional to each other, since the inductors L1 and L2 are not coupled, as explained above. With the prerequisite of VC1>Vrect, the current of L1 decreases faster than the current of L2. Both switch 4 and diode D have to carry the sum of the currents of both inductors L1 and L2.

Figure 3:
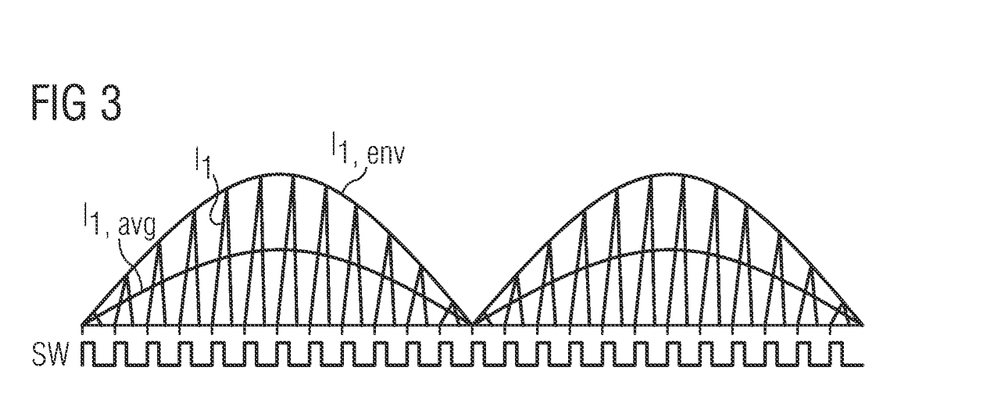
FIG. 3 shows characteristic curves of power factor parameters in the AC-DC converter circuit arrangement of FIG. 1.

From eq. (1) it can be seen that the upward slope and thus the peak current of boost inductor L1 is proportional to the rectified input voltage as long as it is operated in discontinuous conduction mode (DCM) with a constant duty cycle. Thus, averaging of the current by the input EMI filter 7 provides the input current waveform of a PFC converter, as depicted in FIG. 3 which illustrates simplified schematic curves of the instantaneous input current ($I_1$), the averaged input current ($I_{1,avg}$) and the envelope curve of the input current ($I_{1,env}$) as well as the control signal of the switch 4 (SW). In the proposed converter topology group, the input current I1 equals the current IL1 through the input inductor L1 which is operated in DCM.

However, the falling slope of the current I1 (see FIGS. 2 and 3) differs from the rising slope, so that the averaged current does not have an exact sinusoidal shape. The higher VC1 and Vout, the faster the current I1 declines and the less the downward slope contributes to the averaged current, more and more approximating a unity power factor (PF ~1.0). This means that for a power factor approximating a unity power factor, the contribution of the falling slope to the total average current must be minimized in order to maximize the power factor. This can be achieved by increasing VC1 and reducing the L1/L2 ratio respectively.

Furthermore, it can be seen from eq. (3) and (4) that the current IL1 of the inductor L1 of switched-mode input converter sub-stage 2 always decreases faster than the current IL2 of the inductor L2 of switched-mode output converter sub-stage 3 as long as VC1>Vrect. While the average value of VC1 depends on the maximum peak input voltage, the output voltage Vout and the ratio L1/L2, the ripple $\Delta V_{C1}$ depends on the output power, the AC mains frequency, VC1 and the capacitance C1 itself. Therefore, the AC-DC converter circuit arrangement 1 must be designed in a way that VC1 can always be used as a voltage source for the switched-mode output converter sub-stage 3. It should be noted that VC1 can only rise above the input voltage if the input is connected over a rectifier. For example, if a SEPIC, in contrast to the herein described operation scenario, is conventionally operated with a DC input, there usually is no diode so that VC1 averaged over the switching ripple approximately follows the input voltage instead of being boosted above the input voltage. The one or more input rectifier diodes must also be of fast or ultra-fast type so that no significant current flows in reverse direction during diode recovery.

As already stated, the power factor achieved using a constant duty cycle can be controlled by choosing the appropriate ratio L1/L2 given a constant alternating input voltage 8 and output voltage Vout. If the controller ignores the switched-mode input converter sub-stage 2, which is the fundamental idea of this disclosure, however, a constant duty cycle is not guaranteed. For a proper PFC operation, the duty cycle should be as constant as possible. Given a constant load at the output side, this implies a constant VC1 which again implies an infinite capacitance C1. The ripple $\Delta V_{C1}$ leads to a distortion of the input current I1. For example, if VC1 declines, the turn-on time of the switch 4 and the duty factor of the duty cycle, i.e., the ratio between on time and off time, respectively, have to be increased in order to transfer the same power to the output by increasing the current (so that P=U*I is constant averaged over the switching cycle). However, for compliance with strict power factor regulations, a usually demanded power factor above 0.9 can easily be achieved with usual capacitances.

Also, a DCM operation of the inductor L1 of the switched-mode input converter sub-stage 2 must always be ensured for the PFC functionality. If the output inductor L2 of the switched-mode output converter sub-stage 3 is operated in DCM or in BCM, the input DCM operation is ensured as long as VC1>Vrect. If the output inductor is operated in continuous conduction mode (CCM), special attention has to be focused on the input inductor operation, even if VC1>Vrect. If the input inductor shifts to CCM, the approximate proportionality of input voltage and input current is not guaranteed anymore.

This analysis leads to the following conclusions about the properties and prerequisites that alone or in combination preferably have to be fulfilled so that the operation principle can be applied to a given AC-DC converter and so that an automatic PFC is achieved when only controlling the switched-mode output converter sub-stage 3:

The input must be connected through a rectifier 6 to the input inductor L1 (usually a bridge rectifier). The rectifier 6 must be fast enough to follow the input inductor current IL1 and be able to withstand voltage peaks created by the common ringing of the input inductor L1 (or a voltage clamp must be implemented after the rectifier 6).

The converter circuit arrangement must have a boosting input sub-stage (switched-mode input converter sub-stage 2) which is able to create an intermediate voltage VC1 higher than the rectified input voltage Vrect. This can be achieved by the illustrated SEPIC converter or alternatively (not illustrated) by the Cuk converter (in contrast, for example, to the Zeta converter having a buck input sub-stage).

The EMI filter 7 has to be placed electrically upstream (in FIG. 1 in front of) the rectifier 6. Capacitances placed between rectifier 6 and input inductor L1 disturb the automatic PFC operation. The EMI filter 7 is used as input capacitor providing the charge for the input inductor L1, therefore requiring fast rectifiers.

The intermediate power storage capacitor C1 should be large enough so that the switched-mode output converter sub-stage 3 can use VC1 as voltage supply without disrupting the desired degree of PFC operation. The specific value of the allowable minimum voltage of VC1 as well as the tolerable ripple $\Delta V_{C1}$ are design-specific and depend, for example, on the used topology, power level, the inductor ratio L1/L2, the desired power factor, etc.

A DCM operation of the input inductor L1 of the switched-mode input converter sub-stage 2 must be ensured if the active PFC should be obtained automatically.

The duty cycle should be as constant as possible (by using an adequate large intermediate capacitance C1). Variations of the duty cycle lead to a distortion of the input current I1 and can worsen the power factor below acceptable levels.

at least when using SEPIC or Cuk converter designs, in contrast to usual SEPIC/Cuk designs, no coupled inductors must be used (L1 and L2 must not be coupled) in order to guarantee an asynchronous current flow of IL1 and IL2 (see FIG. 2 and explanations above) required for the PFC operation.

Given the above aspects for an automatic PFC in SEPIC, Cuk or similar converters, a control scheme as explained in the context of FIG. 1 can be applied that satisfies all of the constraints when used with accordingly dimensioned power components.

In general, the output inductor L2 can be operated in continuous conduction mode (CCM), discontinuous conduction mode (DCM) or boundary conduction mode (BCM). For each mode, a DCM operation of L1 can still be ensured by choosing proper components, as the inductors preferably are not coupled and thus allow asynchronous current waveforms, as depicted by eq. (1) to (4) and as explained above. While CCM has the advantage of lowest peak and thus RMS average currents through the output inductor L2 and the switch 4 as well as reduced core losses and is therefore mainly used for high power applications, there are mainly five aspects that have to be taken into account when CCM is used for this concept. These aspects primarily arise from the DCM constraint for the input inductor L1:

Given E=0.5 LI$^2$ for the stored energy E within an inductance L given a current I through the inductor, CCM leads to an energy transfer imbalance between both inductors L1 and L2. The output inductor current IL2 starts rising from an offset in CCM, the DCM input inductor current IL1 from zero. So, the on-time of the switch 4 will be shorter, the larger the CCM offset is. Thus, the input inductor current IL1 does not reach the same peak as compared to DCM. Hence, the transferred energy is smaller. As a consequence, the average voltage VC1 of the intermediate capacitor C1 will drop, worsening power factor and ripple. In order to avoid this, the L1/L2 ratio must be reduced in CCM. This implies a dependence of the L1/L2 ratio and the CCM offset current which again usually depends on the output current. So, CCM generates a dependence of the output current and VC1 which is not seen in DCM/BCM operation and can be difficult to manage when used for variable output current applications (like dimming of a luminaire)—the power factor could drop below minimum limits and VC1 could exceed component specifications.

CCM does not offer zero-current-turn-on of the switch 4 and zero-current-turn-off of the output diode D as DCM or BCM do, which increases switching losses.

Even if VC1>Vrect, the input inductor L1 could switch into CCM which disables the automatic PFC operation. So special attention must be focused on the sizing of the components in CCM of the output inductor L2.

For a given operation frequency range, CCM requires larger inductances.

A CCM control scheme is much more complex, increasing development, testing and implementation cost.

Hence, as explained above an illustrated in FIG. 1, a (variable-frequency) boundary conduction mode (BCM) operation of the output inductor L2 by measuring its inductor current IL2 is suggested, which can be preferable over the CCM operation according to the following aspects:

By having no idle time without conduction, the efficiency is optimized compared to DCM.

As CCM operation of the output inductor L2 is avoided, a DCM operation of the input inductor is guaranteed as long as VC1>Vrect, which can easily be achieved by adequate sizing of the inductors L1 and L2 and the intermediate capacitor C1. Thus, high flexibility is provided concerning varying output power levels between designs or even dynamically during operation (e.g., dimming).

Due to this flexibility, the output can easily be adjusted over the feedback signal of the controller 14 (see FIG. 1) or the voltage/current reference. In the field of LED lighting for example, this abandons the need for an additional PWM dimming stage.

The switching frequency may vary during one period of the alternating input voltage 8. This generates an automatic spread spectrum modulation of the input current, enabling a reduction of the input EMI filter 7 for cost and size optimization. If required, the spectrum could be spread further by adding some noise to the signal of controller 14, adding additional variation to the switching frequency.

Offering zero-current-switching (zero-current-turn-off) of the output diode D with minimal reverse-recovery-losses, the reverse recovery time is not crucial, enabling the use of lower-cost diodes as DCM does. Also MOSFET turn-on losses are minimal due to zero-current-turn-on.

The control scheme is easy to implement in hard-/software for low development cost.

Altogether, BCM is very suited for the operation of the AC-DC converter with automatic PFC. In contrast to other regulation schemes; it is very flexible and offers several other advantages as explained. If going to lower power levels, the switching frequency increases as do the switching losses. Thus, it might be useful to implement a minimum off-time, forcing DCM operation in the region where switching losses dominate ohmic losses.

Nevertheless, also, a CCM operation can be implemented, e.g., by rising the Zero-Reference-Value comparator limit of comparator 10 (see FIG. 1) to values larger than zero. However, special care must then be given to the above-mentioned aspects arising out of CCM operation.

Figure 4:
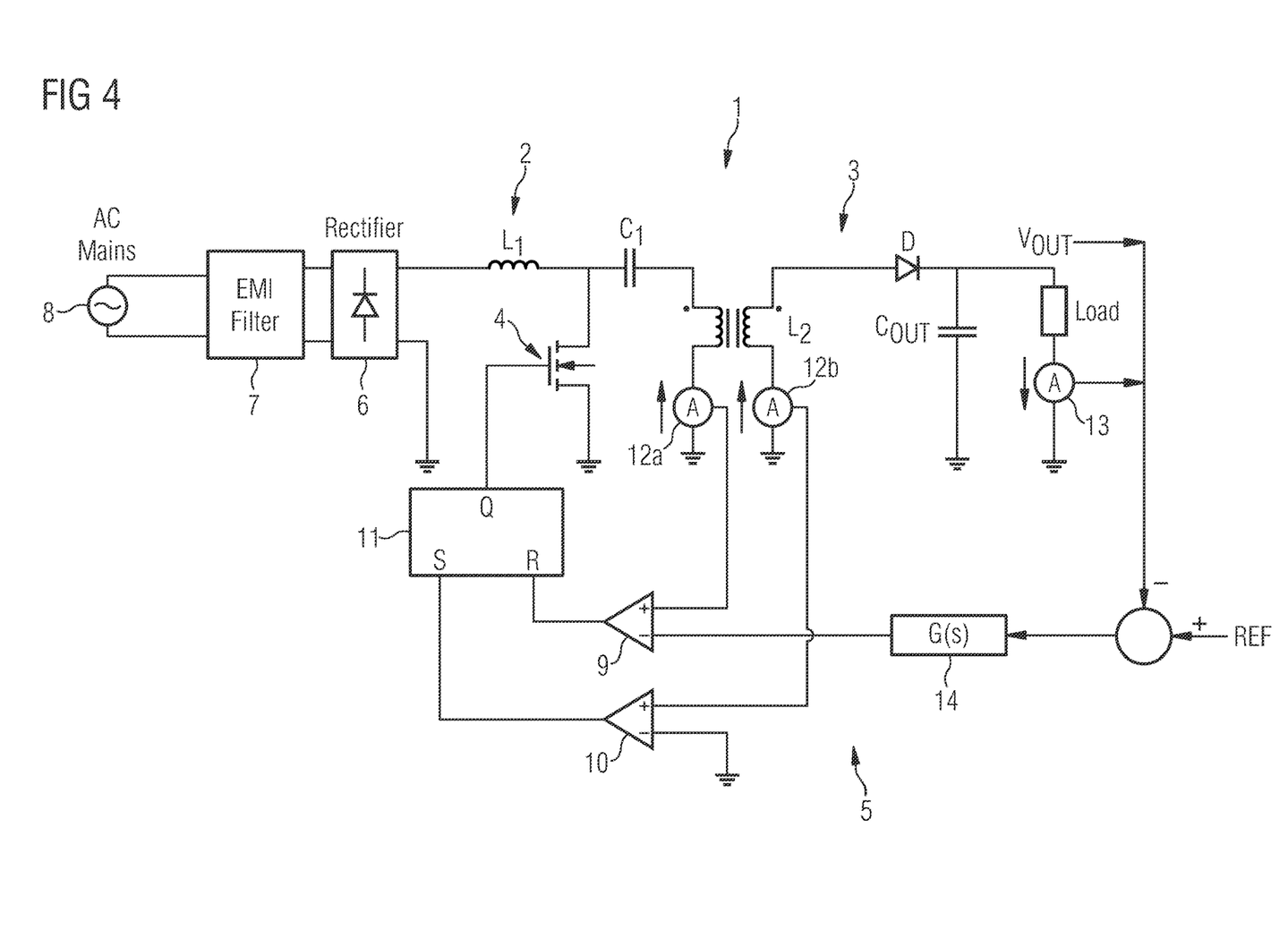
FIG. 4 shows another embodiment of an AC-DC converter circuit arrangement.

FIG. 4 illustrates another embodiment of an AC-DC converter circuit arrangement. This embodiment has analogous functionality compared to the embodiment of FIG. 1, in particular an equivalent BCM control scheme. The sole difference lies in the fact that in FIG. 4 the SEPIC converter is a topology with an isolated, transformer based output inductor topology L2. The output inductor L2 (see FIG. 1) is simply split into two windings of a flyback transformer. Inductor currents IL2 are sensed by two different ammeters 12a and 12b and fed into the two comparators 9 and 10.

In various embodiments the proposed control scheme can easily be adapted with a quasi-resonant switching technique in order to reduce losses in the switch 4 which occur by periodically charging and discharging the output "parasitic" Drain-Source capacitance of the MOSFET switch 4. The Drain-Source capacitance of the switch 4 and the output inductor L2 together form a resonant L-C-circuit. A reduction of losses in the switch 4 can be achieved by implementing a delay time between inductor zero-current-detection (by comparator 10 in FIG. 1 or 4) and sensing the arising oscillations of the drain voltage in the L-C-circuit between Drain-Source capacitance of the switch 4 and the output inductor L2. This can also be achieved using an auxiliary winding of the output inductor L2. The switch 4 is then turned on by means of the controller 14 at a valley point of the oscillating drain voltage. This significantly reduces voltage stress and switching losses of the switch 4.

In various further conceivable embodiments, not explicitly illustrated in the figures, the proposed converter topology can be enhanced by several other technologies. Synchronous output rectification using a switch instead of the diode D can decrease output rectifier conduction losses. An isolated output can be provided, e.g., by replacing the output inductor L2 by a flyback-transformer in the SEPIC design (see FIG. 4), possibly combined with active or passive clamp technologies for protection against voltage spikes. Multiple output voltages can be generated using a transformer with multiple secondary windings.

Control schemes similar to the proposed ones can be adapted to several other converter topologies, besides the SEPIC or Cuk topology, that share the integrated PFC feature of the proposed converter topology. Hence, the illustrated control schemes can be generalized to all converters that employ a boosting input sub-circuit or sub-stage as long as the following aspects (alone or in combination) are taken into account:

a used rectifier 6 is designed to be fast enough (low reverse recovery time) to follow the current of input inductor L1, the input inductor L1 is operated in discontinuous conduction mode (DCM), switch 4 is driven with a quasi-constant duty cycle, capacitor C1 is large enough to buffer the energy for the output converter sub-stage during a cycle of the alternating input voltage 8.

Under consideration of these aspects, any converter topology downstream of the input converter sub-stage may provide a regulated output voltage/current using C1 as input voltage source and the switch 4 as part of its circuit. Then, the resulting overall converter topology automatically has an integrated PFC provided as explained above. Following this general principle of the "integrated PFC" topology, the exact implementation of the second converter and its controller can be variable. For example, it can be operated in CCM, DCM or BCM, can use an inductor or transformer, can implement quasi-resonant or resonant switching, etc. As long as the explained prerequisites and aspects are met, the converter achieves a very high power factor above 0.9.

The disclosure, therefore, describes an add-on power factor correction (PFC) functionality which enables AC-DC converters to achieve a very high power factor (PF) while still being able to perform a tight output regulation for low output ripple. As an essential feature, this concept does not rely on large (electrolytic) smoothing capacitors and thus can be used for the realization of AC-DC converters with very long lifetimes even under high-temperature environments, like, e.g., within an LED luminaire.

We claim:

1. An AC-DC converter circuit arrangement for supplying a load, the AC-DC converter circuit arrangement comprising:
- a switched-mode input converter sub-stage comprising a step-up converter configured to convert a rectified input voltage on an input side into an intermediate voltage higher than the rectified input voltage;
- a switched-mode output converter sub-stage configured to convert the intermediate voltage into a direct output voltage at an output side;
- a switch configured to switch both the switched-mode input converter sub-stage and the switched-mode output converter sub-stage; and
- a control circuit configured to control the switched-mode output converter sub-stage to a power demand at the output side independent of the switched-mode input converter sub-stage by operating the switch with a controlled duty cycle,
- wherein the control circuit is connected to the switched-mode output converter sub-stage and the output side and configured to apply a first control parameter based on a sensed output voltage and/or a sensed output current and to apply a second control parameter based on a sensed current and/or a sensed voltage of the switched-mode output converter sub-stage, and
- wherein the AC-DC converter circuit arrangement is configured to automatically operate the switched-mode input converter sub-stage in a discontinuous conduction mode by operating the switch during control of the switched-mode output converter sub-stage through the control circuit.

2. The AC-DC converter circuit arrangement according to claim 1, wherein the switched-mode output converter sub-stage comprises a step-down converter stage for converting the intermediate voltage into the output voltage lower than the intermediate voltage.

3. The AC-DC converter circuit arrangement according to claim 1, further comprising an electric energy buffer configured to buffer electric energy generated in the switched-mode input converter sub-stage and dimensioned to achieve the intermediate voltage higher than the rectified input voltage and to provide the intermediate voltage as a supply voltage to the switched-mode output converter sub-stage.

4. The AC-DC converter circuit arrangement according to claim 1, wherein the control circuit is configured to control the switched-mode output converter sub-stage to operate in a boundary conduction mode.

5. The AC-DC converter circuit arrangement according to claim 4, wherein the control circuit comprises:
- a first comparator configured to compare a value of the first control parameter based on a difference between the output voltage or the output current and a respective reference value with a value of an inductor current of the switched-mode output converter sub-stage as the second control parameter; and
- a second comparator configured to compare the value of the inductor current of the switched-mode output converter sub-stage as the second control parameter with a Zero-Reference-Value.

6. An AC-DC converter circuit arrangement according to claim 1, wherein the switched-mode input converter sub-stage comprises at least one first inductor, wherein the switched-mode output converter sub-stage comprises at least one second inductor, and wherein the first and second inductors are isolated from each other.

7. A method for operating an AC-DC converter circuit according to claim 1, the method comprising:
- converting an input voltage to the output voltage.

8. A method for operating an AC-DC converter circuit arrangement for supplying a load, the method comprising:
- converting a rectified input voltage on an input side into an intermediate voltage higher than the rectified input voltage by a switched-mode input converter sub-stage; and
- converting the intermediate voltage into a direct output voltage at an output side by a switched-mode output converter sub-stage,
- wherein a switch is operated by a control circuit with a controlled duty cycle, the switch for switching both the switched-mode input converter sub-stage and the switched-mode output converter sub-stage,
- wherein the control circuit applies a first control parameter based on a sensed output voltage and/or a sensed output current and a second control parameter based on a sensed current and/or a sensed voltage of the switched-mode output converter sub-stage for controlling the switched-mode output converter sub-stage to a power demand at the output side independent of the switched-mode input converter sub-stage, and
- wherein the switched-mode input converter sub-stage is automatically operated in a discontinuous conduction mode by operating the switch during control of the switched-mode output converter sub-stage through the control circuit.

9. The method according to claim 8, wherein the intermediate voltage is converted into the output voltage lower than the intermediate voltage.

10. The method according to claim 8, wherein electric energy generated in the switched-mode input converter sub-stage is buffered in an electric energy buffer such that the intermediate voltage higher than the rectified input voltage is achieved and provided as a supply voltage to the switched-mode output converter sub-stage.

11. The method according to claim 8, wherein the switched-mode output converter sub-stage is controlled by the control circuit such that the switched-mode output converter sub-stage operates in a boundary conduction mode.

12. The method according to claim 11,
- wherein the control circuit compares a value of the first control parameter based on a difference between the output voltage or the output current and a respective reference value with a value of an inductor current of the switched-mode output converter sub-stage as the second control parameter,
- wherein the control circuit compares the value of the inductor current of the switched-mode output converter sub-stage as the second control parameter with a Zero-Reference-Value, and
- wherein the control circuit enables the switch as soon as the value of the inductor current of the switched-mode output converter sub-stage reaches the Zero-Reference-Value and disables the switch as soon as the value of the inductor current of the switched-mode output converter sub-stage reaches the value of the first control parameter.

* * * * *